United States Patent [19]

Flauss

[11] Patent Number: 5,779,297
[45] Date of Patent: Jul. 14, 1998

[54] SLIT-COVERING PROFILE WITH INTEGRATED REPAIR SOLUTION

[75] Inventor: Hasso Flauss, St. Wendel-Winterbach, Germany

[73] Assignee: Saar-Gummewerke GmbH, Wadern-Büschfeld, Germany

[21] Appl. No.: 672,061

[22] Filed: Jun. 26, 1996

[30] Foreign Application Priority Data

Jun. 28, 1995 [DE] Germany .................. 195 22 980.0

[51] Int. Cl.⁶ .................................................. B60R 13/06
[52] U.S. Cl. .................................................. 296/93; 296/200
[58] Field of Search ........................... 296/93, 200, 201

[56] References Cited

U.S. PATENT DOCUMENTS 5,607,197  3/1997  Yada ................................... 296/93
5,618,079  4/1997  Yukihiko et al. ................... 296/93

FOREIGN PATENT DOCUMENTS 2237046  7/1974  France.
1172130  9/1970  Germany.
2228869  6/1972  Germany.

*Primary Examiner*—Jesus D. Sotelo
*Attorney, Agent, or Firm*—James Creighton Wray; Meera P. Narasimhan

[57] ABSTRACT

The invention relates to a slit-covering profile for covering defined slits between glass and vehicle body, especially in automobiles, which is characterized in that the clamping area of the profiles in the foot zone can be shortened by tearing off the front foot area along the tear-off edges so that a remounting of the profile with installed windshield can be carried out without problem.

8 Claims, 2 Drawing Sheets

SLIT-COVERING PROFILE WITH INTEGRATED REPAIR SOLUTION

SPECIFICATION

The invention relates to a slit-covering profile for covering a defined slit between windshield and vehicle body, especially in automobiles, wherein the slit covering can be realized as a frame as well as a straight line.

Slit-covering profiles are used in the automobile industry as covers for defined slits between the windshield and the vehicle body. The slit-covering profile is mounted on the glass before the windshield is glued onto the vehicle. For this purpose, it is necessary that the profile can muster sufficient clamping force so that the profile does not slip during handling of the glass as well as during the gluing operation.

In doing so, it is often necessary to repaint the vehicle body around the area of the windshield. For this purpose, the slit-covering profile is dismounted from the glass. Depending on the slit width, the slit-covering profile cannot be built in again, that is put on, after painting. In these cases, so-called repair covering profiles, which act as a slit-covering profile after the repair, are used. In these repair covering profiles, the foot zone of the clamping area is weakened as much as possible, so that the profile can be inserted after the windshield has been installed. The disadvantage of this kind of repair covering profile is that they are not a suitable solution for the manufacture in series due to the lack of clamping effect and defective supporting function. For this reason, it is necessary to manufacture separate covering profiles for complying with the different requirements.

The object of the invention is to integrate the properties of a conventional slit-covering profile with those of a repair covering profile in a profile form according to its function. This way, it would be possible to use one and the same profile for manufacture in series as well as repair solutions. A slit-covering profile with integrated repair solution of this kind complies with both requirements:

a) sufficient clamping force for optimum seating of the profile on the windshield as well as optimum support function (defined distance between glass and vehicle body) and b) a shorter sloping foot for problem-free insertion of the profile in the case of repairs.

In practice, the manufacture of a second profile can be eliminated.

It was found that, when the clamping area of the profile in the foot zone parallel to the covering lip (AL-S) is lengthened, and the foot zone is crossed by a hollow space (H) which stretches into the profile direction but is closed off to the outside, wherein the pipe-shaped to oval-shaped hollow space (H) in the edge areas (AK) reaches into the vicinity of the glass (S) and the vehicle body (K) and that, in these wall areas, the profile has indentations which run in the longitudinal direction and whose indentation object reaches almost to the head or foot area of the hollow space (H), it can fulfill such a function.

By means of this embodiment of the hollow space, the thin-walled cross sections represent defined tear-off edges toward the glass and the vehicle body. By removing the front foot area of the foot zone, the series profile turns into a repair profile. The foot area shortened in this way considerably facilitates the mounting. Independent of the fact that the foot area of the foot zone remains, or is not adhered on the adhesive when dismounting the profile, the mounting of the repair profile can be performed without problems from above. For example, if the front foot area of the foot zone is not removed during dismounting of the profile, it can be torn off at the defined tear-off positions before remounting.

BRIEF DESCRIPTION OF THE DRAWINGS

FIG. 1 shows a slit-covering profile according to the invention with integrated repair solution. The specific profile zones with covering profile (AP-K) are replaced on the vehicle body. The cover lip (AL-S) is replaced on the glass and the foot zone with defined tear-off edges (AK) and the removable foot area (FB). In the case of installation, the slit-covering profile (SAP) leans on the vehicle body (K) with the support feet (AF).

FIG. 2 shows the relatively large clamping area caused by the widening of the foot zone (measure A) and the optimum holding of the windshield obtained therewith.

FIG. 3 shows a slit-covering profile (SAP) according to the invention in its functional position opposite to the glass (S) and vehicle body (K). A defined slit is formed between the glass (S) and the vehicle body (K) by means of the optimum support function of the front foot area (FB), and an even distribution of the adhesive strip (KR) is achieved in this way.

FIG. 4 shows the profile according to the invention after tearing off of the front foot area (FB) of the foot zone and the clamping position (measure B) shortened in this way for facilitating the mounting operation.

FIG. 5 shows how a profile according to the invention, which is assigned the function of a repair profile by means of the tearing off of its front foot area (FB), can be brought into its functional position during a repair operation.

FIG. 6 shows a situation like the one in FIG. 5, but with removed foot area.

Figure 1:
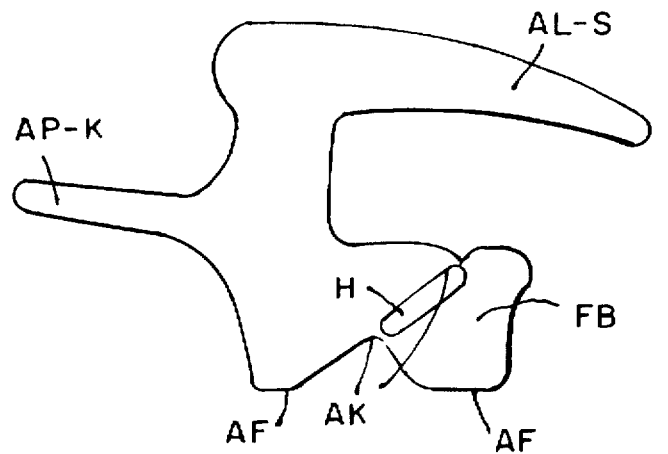
FIG. 1 is a side elevation of a slit-covering profile according to the invention with integrated repair solution.
Figure 2:
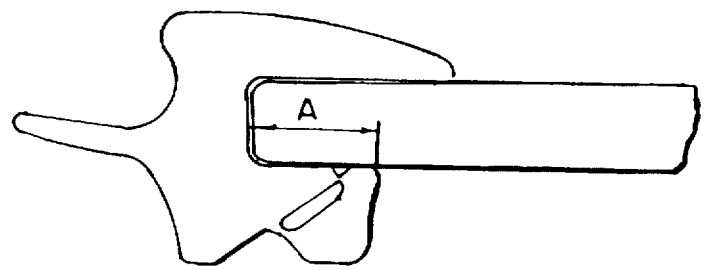
FIG. 2 shows the widened foot zone of the profile when abutting a windshield.
Figure 3:
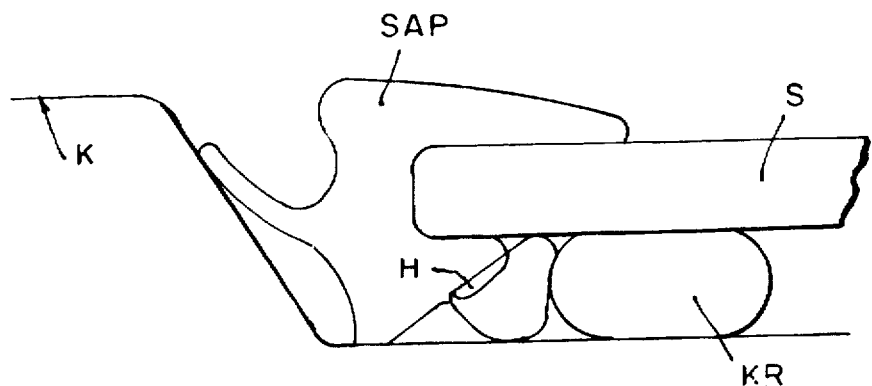
FIG. 3 shows the profile (SAP) of the invention in its functional position opposite to the glass (S) and vehicle body (K).
Figure 4:
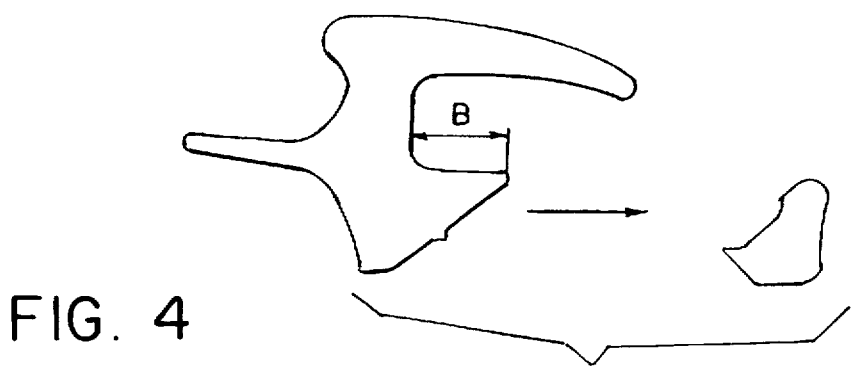
FIG. 4 shows the profile after tearing off of the front foot area (FB) of the foot zone in the clamping position (measure B).
Figure 5:
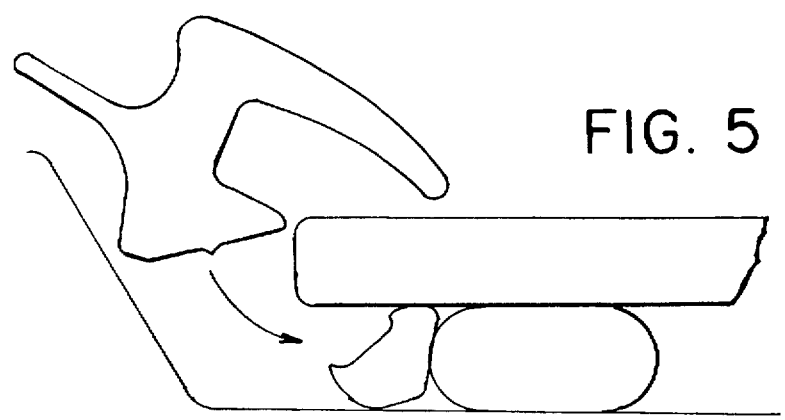
FIG. 5 shows how the profile with a front foot area (FB) torn off and which profile is brought into its functional position during a repair operation.
Figure 6:
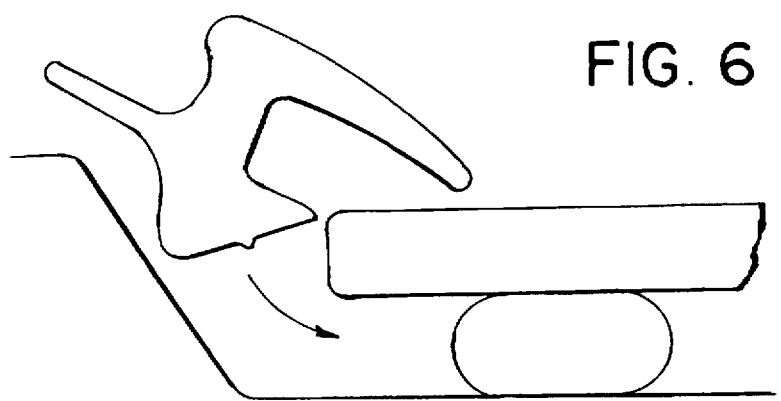
FIG. 6 shows a the profile of FIG. 5 without the torn off foot area.

I claim:

1. A slit-covering profile for covering defined slits between a windshield and a vehicle body comprising a profile having a body, a cover lip along one side of the body, a foot zone along another side of the body, a clamping area on the foot zone having a length parallel to the cover lip, and a hollow space between the clamping area and the foot zone.

2. The profile of claim 1, wherein the hollow space extends in a profile direction and is closed off to an outer side.

3. The profile of claim 1, wherein the hollow space is pipe-shaped.

4. The profile of claim 1, wherein the hollow space is oval-shaped.

5. The profile of claim 1, wherein the hollow space has edge portions for abutting the windshield and the vehicle body.

6. The profile of claim 1, further comprising head and foot areas in the hollow space, and indentations in the profile extending along a longitudinal direction towards the head and foot areas of the hollow space.

7. The profile of claim 1, wherein the vehicle body is an automobile.

8. A slit-covering profile for covering defined slits between windshields and a vehicle body comprising a profile having a foot zone, a tear-off clamping area in the foot zone for tearing-off and shortening a front portion of the foot zone thereby easily remounting the profile on installed windshields.

* * * * *